(12) United States Patent
Wang

(10) Patent No.: US 11,786,983 B2
(45) Date of Patent: Oct. 17, 2023

(54) DOVETAIL SLOT GRID MULTI-PURPOSE WORKTABLE

(71) Applicant: Henry Wang, Winter Springs, FL (US)

(72) Inventor: Henry Wang, Winter Springs, FL (US)

(*) Notice: Subject to any disclaimer, the term of this patent is extended or adjusted under 35 U.S.C. 154(b) by 0 days.

(21) Appl. No.: 17/210,226

(22) Filed: Mar. 23, 2021

(65) Prior Publication Data

US 2021/0299768 A1 Sep. 30, 2021

Related U.S. Application Data

(60) Provisional application No. 63/000,176, filed on Mar. 26, 2020.

(51) Int. Cl.
*B23D 47/02* (2006.01)
*B27B 9/04* (2006.01)
*B27B 27/08* (2006.01)
*B27B 27/02* (2006.01)

(52) U.S. Cl.
CPC .............. *B23D 47/025* (2013.01); *B27B 9/04* (2013.01); *B27B 27/02* (2013.01); *B27B 27/08* (2013.01)

(58) Field of Classification Search
CPC .... B23D 47/025; B23D 47/04; B23D 47/042; B23D 47/045; B23D 47/047; B23D 47/06; B23D 47/065; B27B 9/04; B27B 27/02; B27B 27/08; B27B 27/04; B25H 1/02; B25H 1/08
See application file for complete search history.

(56) References Cited

U.S. PATENT DOCUMENTS

| | | | | |
|---|---|---|---|---|
| 4,516,612 A | * | 5/1985 | Wiley | B23D 47/04 144/1.1 |
| 5,159,864 A | * | 11/1992 | Wedemeyer | B23D 47/025 83/477.1 |
| 5,191,935 A | * | 3/1993 | McCombie | B23Q 9/00 144/287 |
| 5,201,863 A | * | 4/1993 | Peot | B27B 5/222 83/435.14 |
| 5,509,644 A | * | 4/1996 | Engibarov | B25H 1/08 269/99 |
| 5,931,726 A | | 8/1999 | Peters | |
| 7,077,043 B1 | * | 7/2006 | Koerble | B27B 29/10 144/204.2 |
| 2003/0015255 A1 | * | 1/2003 | Wang | B23D 47/025 144/287 |
| 2003/0140985 A1 | * | 7/2003 | Wang | B25H 1/14 144/287 |
| 2003/0213349 A1 | * | 11/2003 | Chang | B27B 25/10 83/438 |
| 2005/0056130 A1 | * | 3/2005 | Chang | B23D 47/025 83/435.12 |
| 2008/0277024 A1 | * | 11/2008 | Kozina | B27B 25/10 83/13 |

(Continued)

OTHER PUBLICATIONS

PCT/US21/23724 International Search Report and Written Opinion, dated Jun. 4, 2021, 10 pages.

*Primary Examiner* — Jonathan G Riley
(74) *Attorney, Agent, or Firm* — Wolter Van Dyke Davis, PLLC; Robert L. Wolter

(57) ABSTRACT

A worktable (100), having: a left slot grid (102); a right slot grid (104) secured to the left slot grid; and a center slide (106) configured to be adjustably positionable between the left slot grid and the right slot grid.

21 Claims, 19 Drawing Sheets

(56) References Cited

U.S. PATENT DOCUMENTS

| | | | |
|---|---|---|---|
| 2008/0284081 A1* | 11/2008 | Smith | B25H 1/10 144/286.5 |
| 2009/0007743 A1* | 1/2009 | Yu | B27B 5/222 83/477 |
| 2009/0178531 A1* | 7/2009 | Fuchs | B23D 51/025 83/781 |
| 2011/0057374 A1* | 3/2011 | Liu | B23D 47/025 108/50.11 |
| 2012/0000339 A1* | 1/2012 | Koegel | B27B 5/222 83/856 |
| 2013/0145913 A1* | 6/2013 | Morgan | B23D 47/025 83/468.6 |
| 2014/0041494 A1* | 2/2014 | Kelly | B27B 27/08 83/13 |
| 2014/0265102 A1* | 9/2014 | Frolov | B23D 47/025 269/309 |
| 2018/0099404 A1* | 4/2018 | Wang | B25H 1/08 |
| 2019/0217447 A1 | 7/2019 | Wang | |

* cited by examiner

US 11,786,983 B2

DOVETAIL SLOT GRID MULTI-PURPOSE WORKTABLE

This application claims benefit of the Mar. 26, 2020 filing date of provisional application 63/000,176 which is incorporated by reference herein.

FIELD OF THE INVENTION

The invention relates to a multi-purpose worktable having a grid of dovetail slots and an extendable center slide. The worktable can be installed on a drill press table or a table saw and enables improved support and clamping of a workpiece on which a drilling or sawing operation will be performed.

BACKGROUND OF THE INVENTION

Drill presses and table saws are often manufactured with relatively small work surfaces in which there may or may not be a means for properly securing a workpiece. In order to provide a suitable working area, a worktable may be secured to the drill press table or may be made to rest on the table saw. The worktable may include means to secure material to the worktable. For example, an aluminum insert having a T-slot recess may be recessed into the upper surface of the worktable. Such an arrangement provides a greater working area and the ability to clamp a workpiece. However, aluminum inserts are costly and must be installed. Moreover, there may be only two aluminum inserts, which limits the clamping options. In addition, the T-slot recess in the aluminum insert can be cumbersome to use. Consequently, there remains room in the art for improvement.

BRIEF DESCRIPTION OF THE DRAWINGS

The invention is explained in the following description in view of the drawings that show.

DETAILED DESCRIPTION OF THE INVENTION

The present Inventor has devised a unique and innovative multi-purpose worktable that provides increased workspace and improved clamping opportunities, and which can be adapted for use on, for example, drill presses and table saws. The worktable takes advantage of a grid of dovetail slots and the Matchfit™ line of products specifically adapted for use with conventional dovetail slots and made by Micro Jig of Winter Park, Fla. The Matchfit™ line of products are configured to cooperate with a dovetail slot made by any standard ½" 14 degree dovetail router bit. Example products include the Matchfit™ dovetail F-clamp as disclosed in U.S. Pat. No. 10,099,398 to Henry Wang which is incorporated herein by reference in its entirety, and disclosed in U.S. patent application Ser. No. 16/110,747 filed Aug. 23, 2018 to Henry Wang which is incorporated herein by reference in its entirety. Another Matchfit™ product includes Matchfit™ dovetail hardware such as a Matchfit™ track screw and the Matchfit™ dovetail anchor nut as disclosed in U.S. application Ser. No. 16/582,556 to Henry Wang filed Sep. 25, 2019 which is incorporated herein by reference in its entirety. Yet another Matchfit™ product includes a Matchfit™ X-Pad/clamp head adapter as disclosed in U.S. application Ser. No. 16/707,562 to Henry Wang filed Dec. 9, 2019 which is incorporated herein by reference in its entirety.

Figure 1:
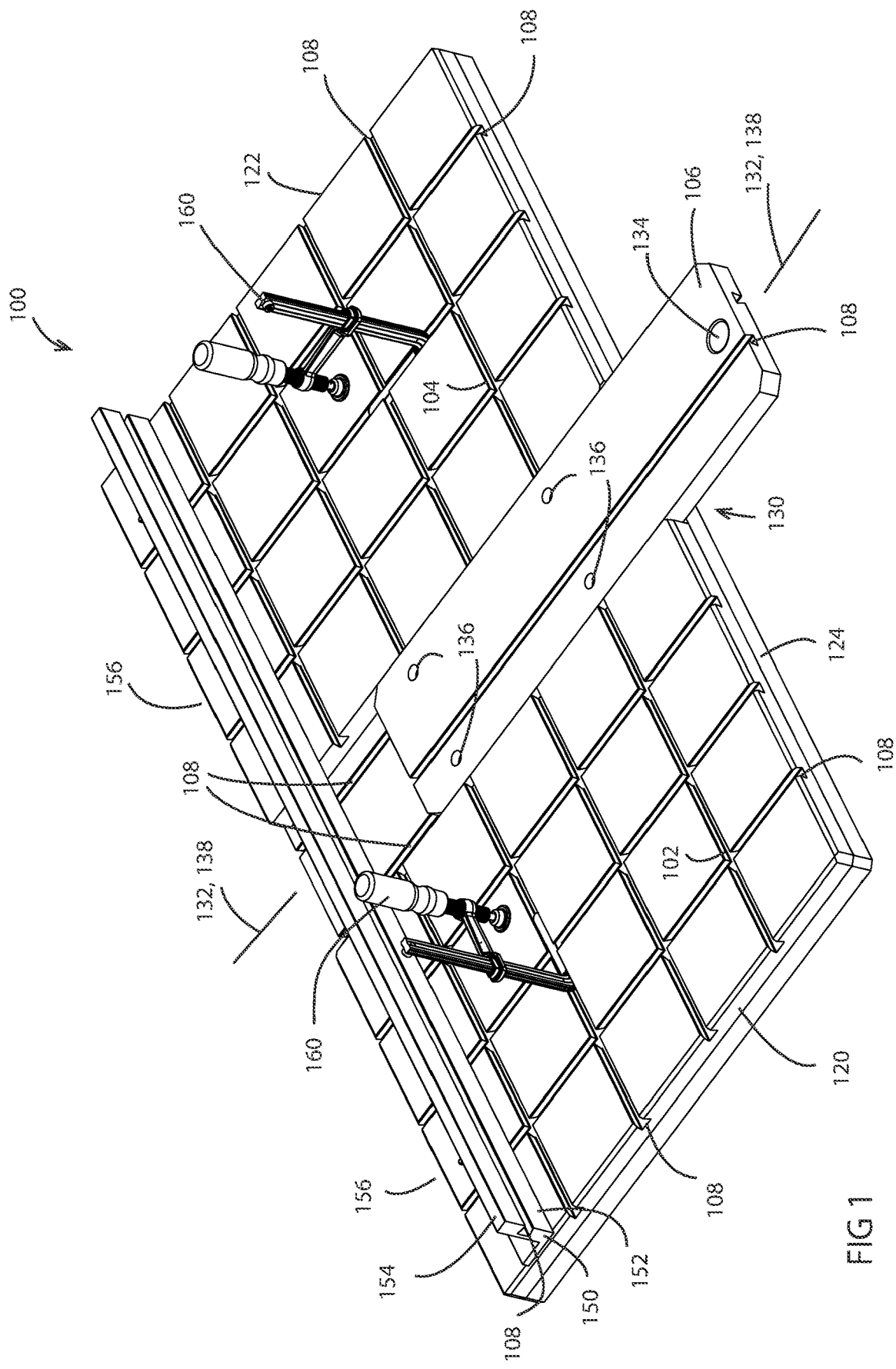
FIG. 1 is a front perspective view of an example embodiment of the dovetail slot grid worktable disclosed herein.

FIG. 1 is a front perspective view of an example embodiment of the dovetail slot grid worktable 100 disclosed herein. The worktable includes a left dovetail slot grid 102, a right dovetail slot grid 104 secured to the left dovetail slot grid 102, and a center slide 106 configured to be adjustably positionable between the left dovetail slot grid 102 and the right dovetail slot grid 104. The center slide 106 may alternately be called a center panel. Each dovetail slot grid includes parallel and perpendicular dovetail slots 108. More dovetail slots 108 may be included and may be disposed at various angles. The dovetail slots 108 have a shape that conforms to a shape made by a standard ½" 14 degree dovetail router bit. While the slot grids have been disclosed as having dovetail slots, any suitable shape is acceptable for the slot grids. For example, the left slot grid and/or the right slot grid may, in addition or alternately, have T-slots or the like. The left dovetail slot grid 102 is disposed in a left wing 120 and the right dovetail slot grid 104 is disposed in a right wing 122. Each wing may be composed of wood or other material in which a dovetail slot 108 may be formed. A support base 124 secures the left wing 120 to the right wing 122. The left wing 120 and the right wing 122 and the support base 124 may be formed from a monolithic/unitary body. Alternately, the support base 124 may be discrete from the left wing 120 and the right wing 122. The support base 124 may extend partially or fully under the left wing 120 and the right wing 122. The support base 124 may optionally include one or more dovetail slots 108.

The center slide 106 is disposed in a gap 130 between the left dovetail slot grid 102 and the right dovetail slot grid 104. The center slide 106 defines a center slide longitudinal axis 132 and is configured to adjust position along the center slide longitudinal axis 132 in a direction forward and rearward relative to the worktable 100. In an embodiment, the center slide 106 may be considered sacrificial in that it is expected that the center slide 106 will be consumed via repeated drillings and/or sawings as will be disclosed. Alternately, or in addition, the center slide 106 can be swapped for other center slides 106 to accommodate different tools/saw blades. For example, when being used as a zero clearance blade insert as will be disclosed below, different center slides can be used with saw blades of different widths and/or at different angles. The center slide 106 may optionally also include one or more dovetail slots 108, a finger grip hole 134, and securing holes 136 to accommodate hardware such as Matchfit™ hardware (not shown) used to secure the center slide 106 to the support base 124.

The dovetail slot 108 may be positioned off-center relative to the center slide longitudinal axis 132. In this example embodiment, the center slide longitudinal axis 132 coincides with a gap longitudinal axis 138 defined by the gap 130. The gap longitudinal axis 138 may align with a tool disposed in a drill chuck of a drill press (not shown). Installation of the center slide 106 with the dovetail slot 108 to the left or to the right of the gap longitudinal axis 138, and hence to the left or the right of any tool installed in the drill chuck of the drill press, prevents the dovetail slot 108 from being damaged even if the tool enters the center slide 106.

The worktable 100 may optionally include a fence 150 having a front face 152. The fence 150 may optionally include a dovetail slot 108 in the front face 152 and/or on a top face 154. The dovetail slots 108 of the left dovetail slot grid 102 and the right dovetail slot grid 104 extend under the fence 150 and to a rear edge 156 of the worktable. This enables a Matchfit™ F-type clamp 160 to extend under the fence 150 from either side of the fence 150.

Figure 2:
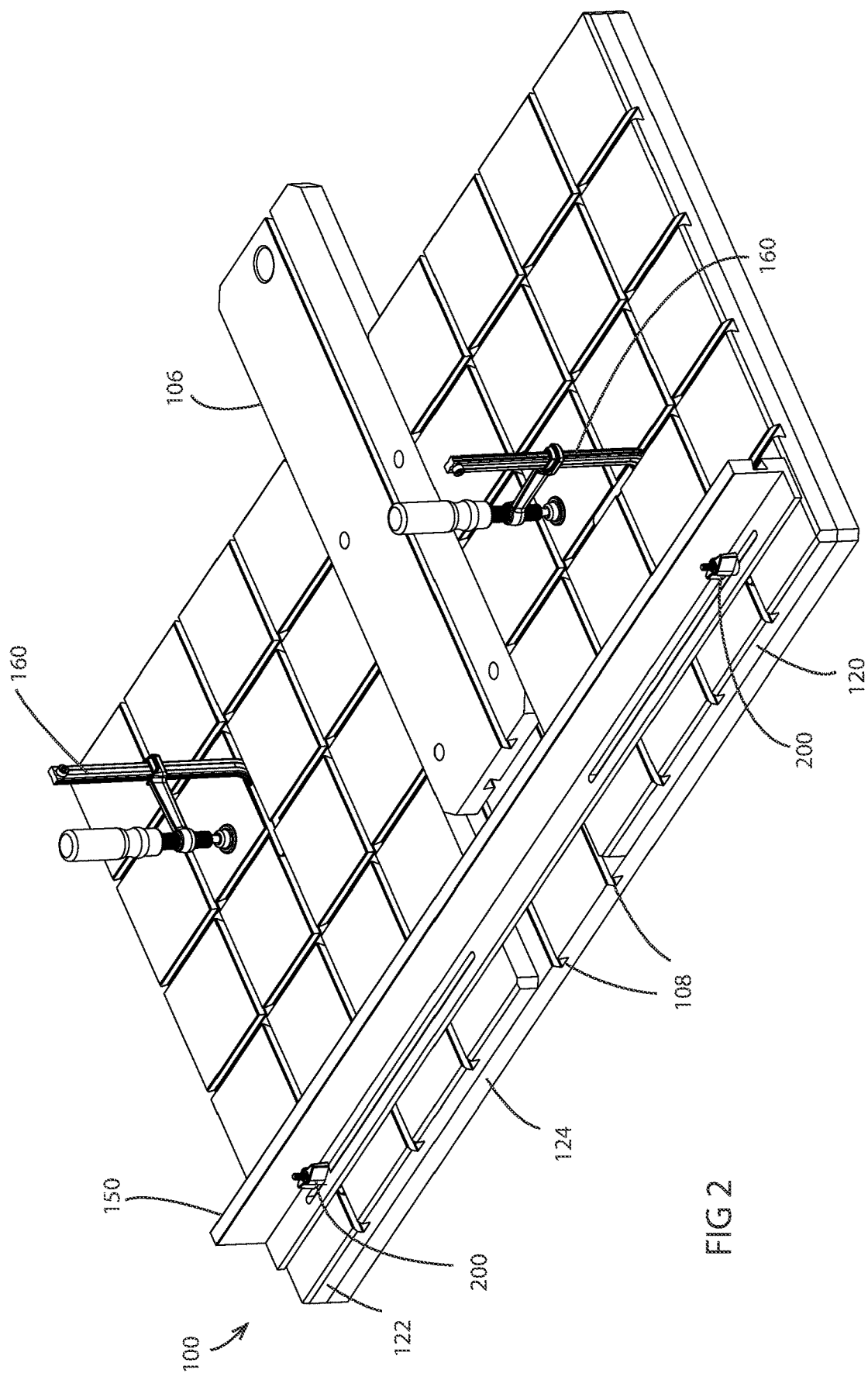
FIG. 2 is a rear perspective view of the worktable shown in FIG. 1.

FIG. 2 is a rear perspective view of the worktable 100 shown in FIG. 1. The fence 150 may be secured to the worktable 100 by Matchfit™ hardware 200 such as track screws and dovetail anchor nuts that cooperate with the dovetail slots 108. The Matchfit™ hardware 200 enable the operator to position the fence 150 in a variety of positions orientations on the worktable 100.

Figure 3:
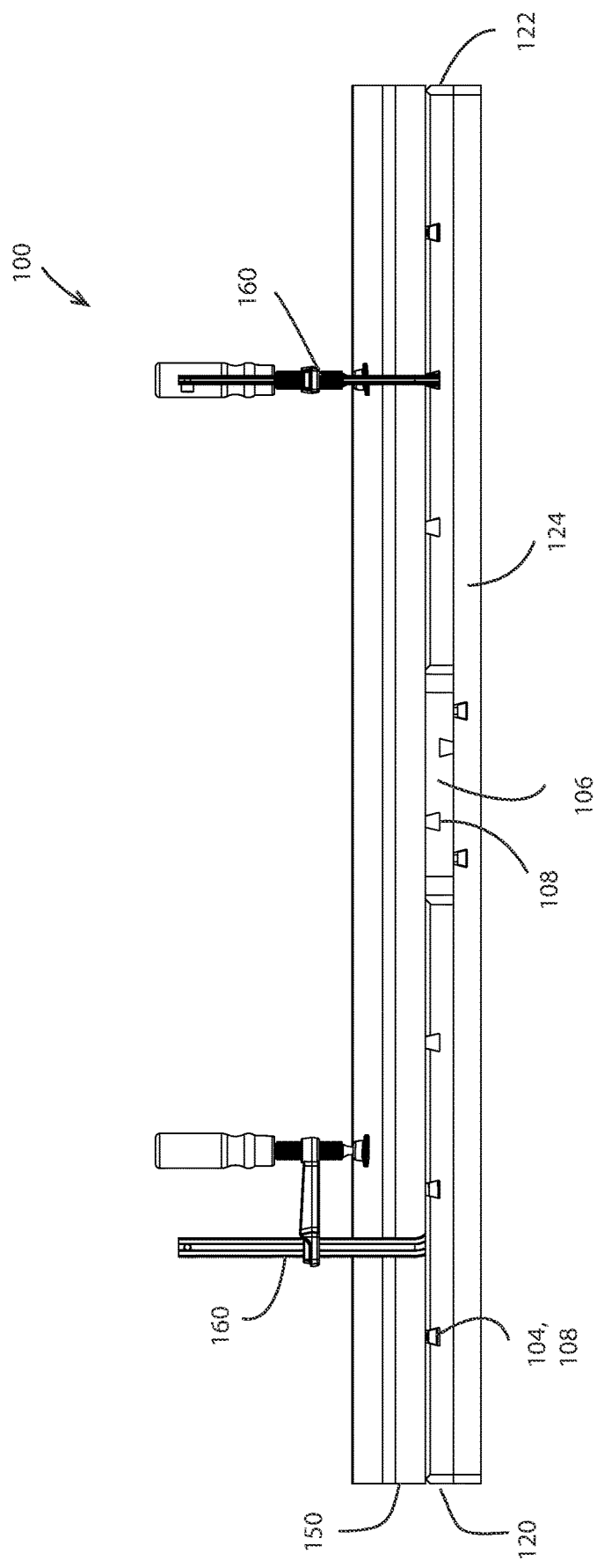
FIG. 3 is a front view of the worktable shown in FIG. 1.

FIG. 3 is a front view of the worktable 100 shown in FIG. 1.

Figure 4:
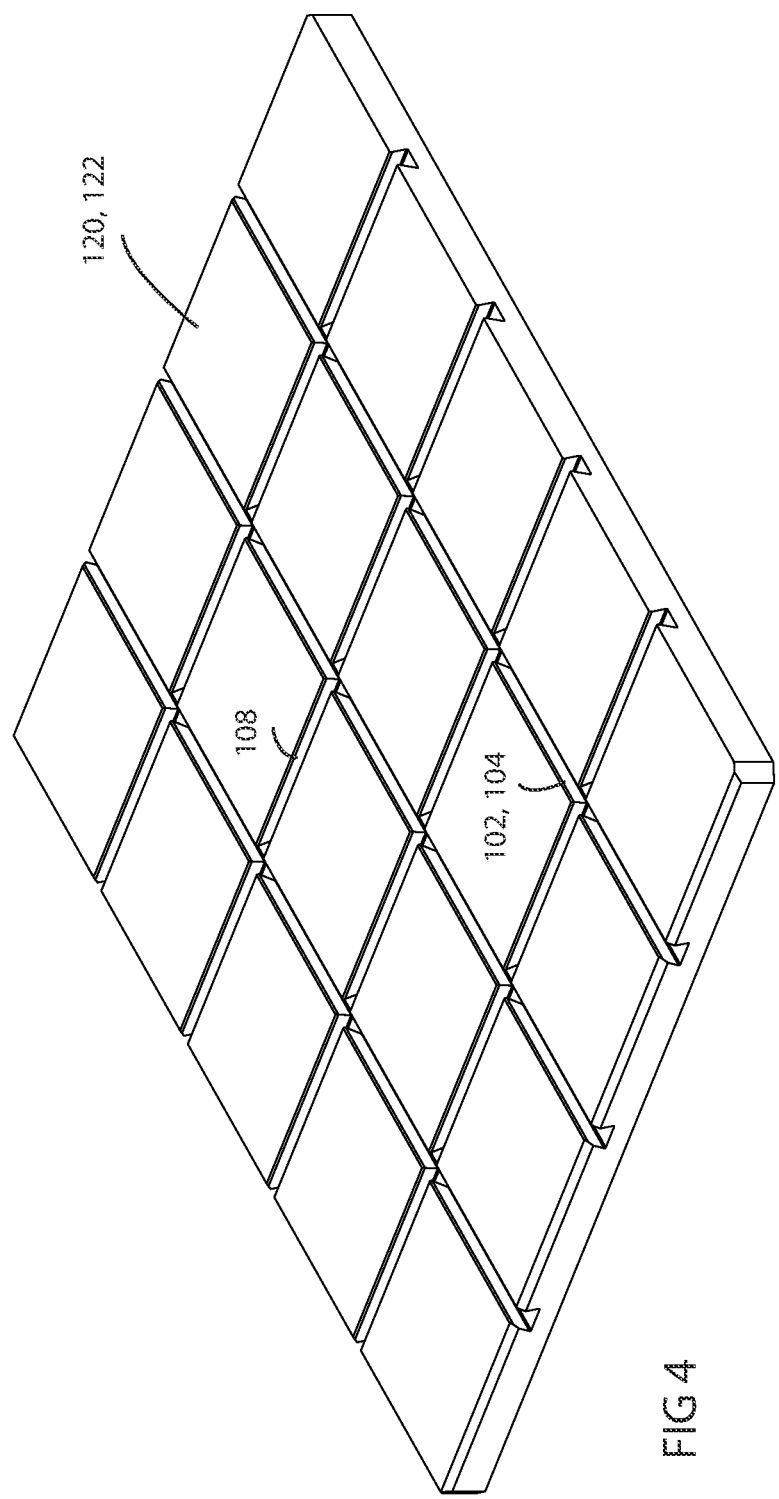
FIG. 4 shows a wing of the worktable of FIG. 1.

FIG. 4 shows the wing 120, 122 of the worktable 100 with the dovetail slot grid 102, 104.

Figure 5:
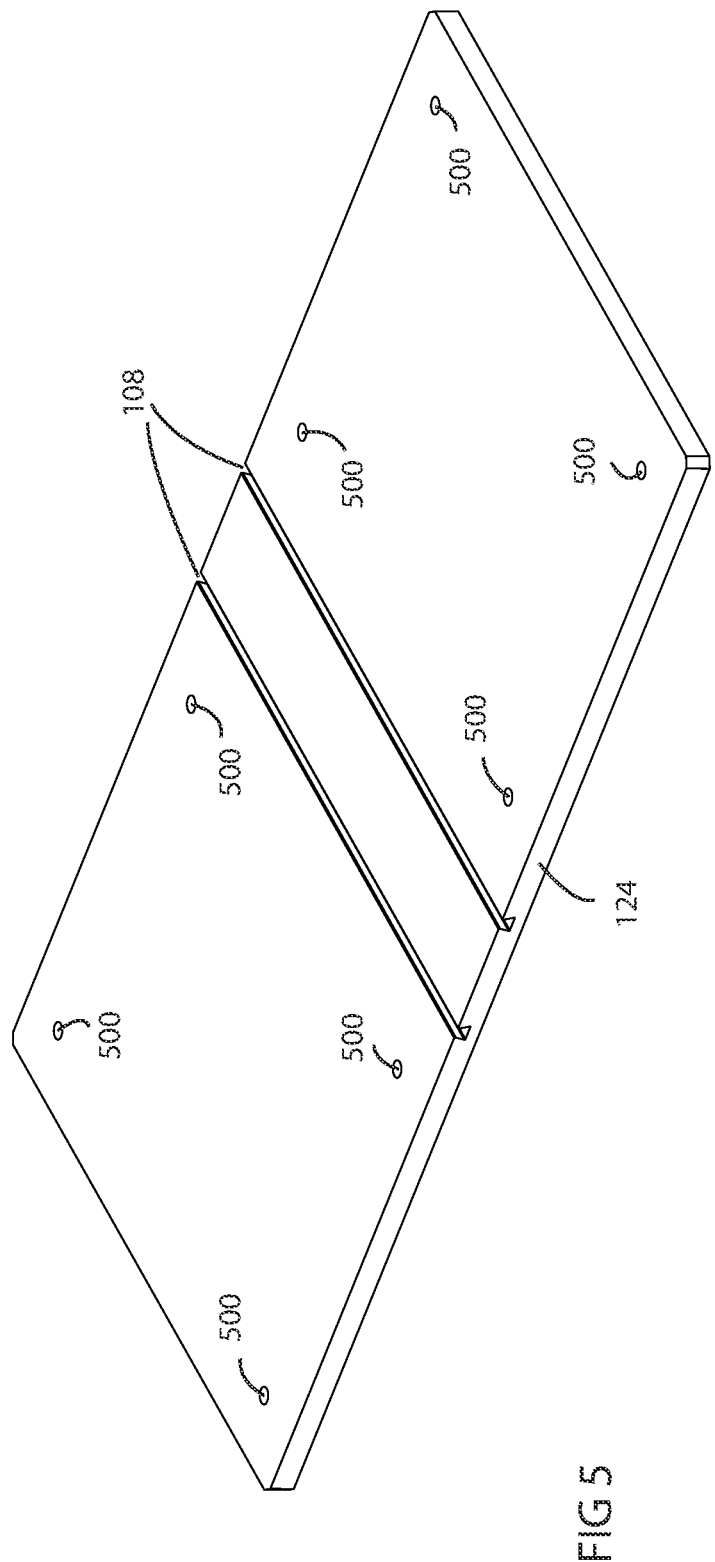
FIG. 5 shows a support base of the worktable of FIG. 1.

FIG. 5 shows the support base 124 of the worktable of FIG. 1. The support base 124 has dovetail slots 108 that may align with the securing holes 136 in the center slide 106. Matchfit™ hardware 200 can be installed in the securing holes 136 and the dovetail slots 108 in the support base 124 to adjustably position and secure the center slide 106 to the support base 124. Support base holes 500 may be used to secure the wings 120, 122 to the support base 124 when the support base 124 is discrete.

Figure 6:
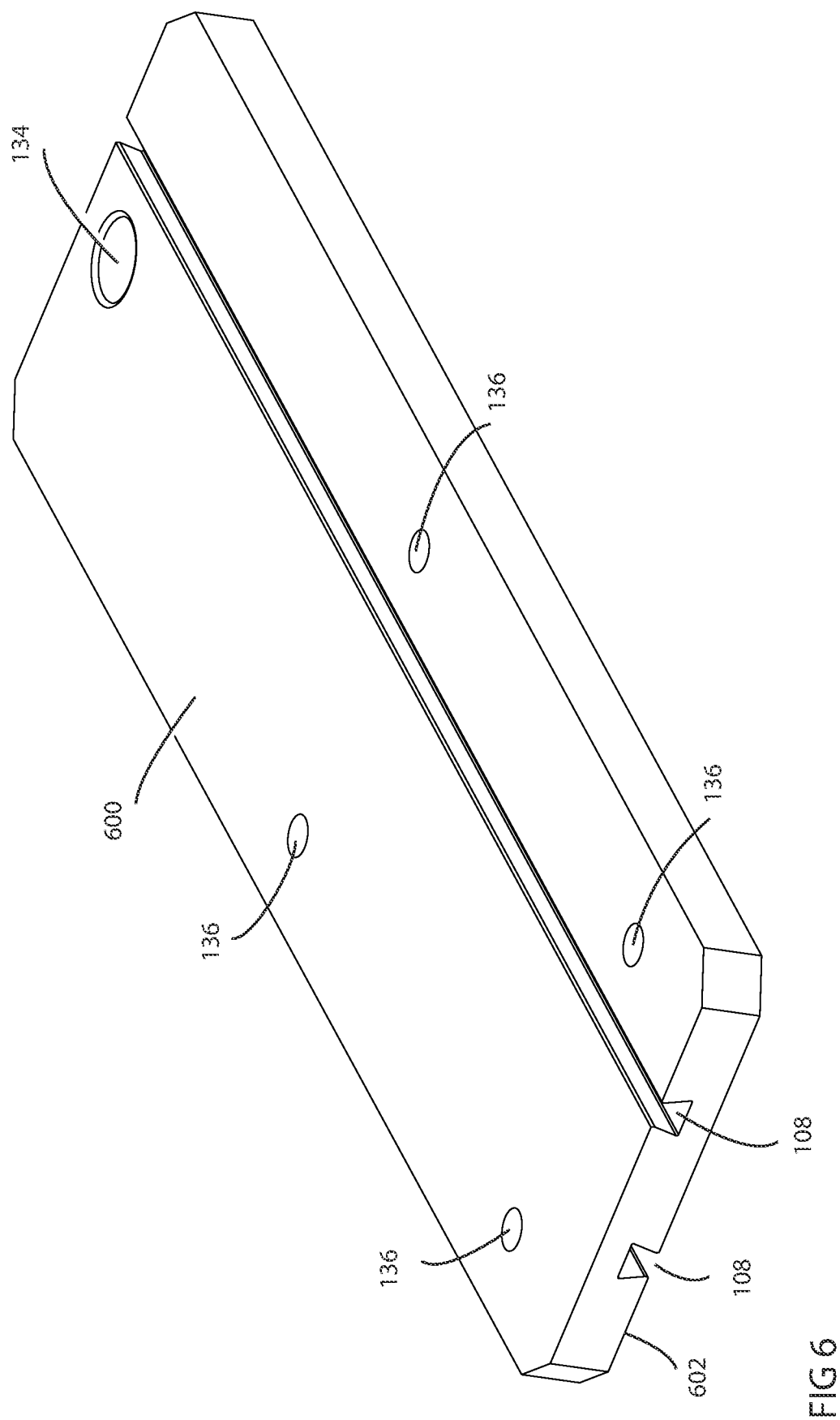
FIG. 6 shows a center slide of the worktable of FIG. 1.

FIG. 6 shows the center slide 106 of the worktable 100 of FIG. 1. A dovetail slot 108 is disposed in a center slide upper surface 600 and another dovetail slot 108 is disposed in a center slide lower surface 602. This provides availability of a dovetail slot 108 regardless of which side of the center slide 106 is up.

Figure 7:
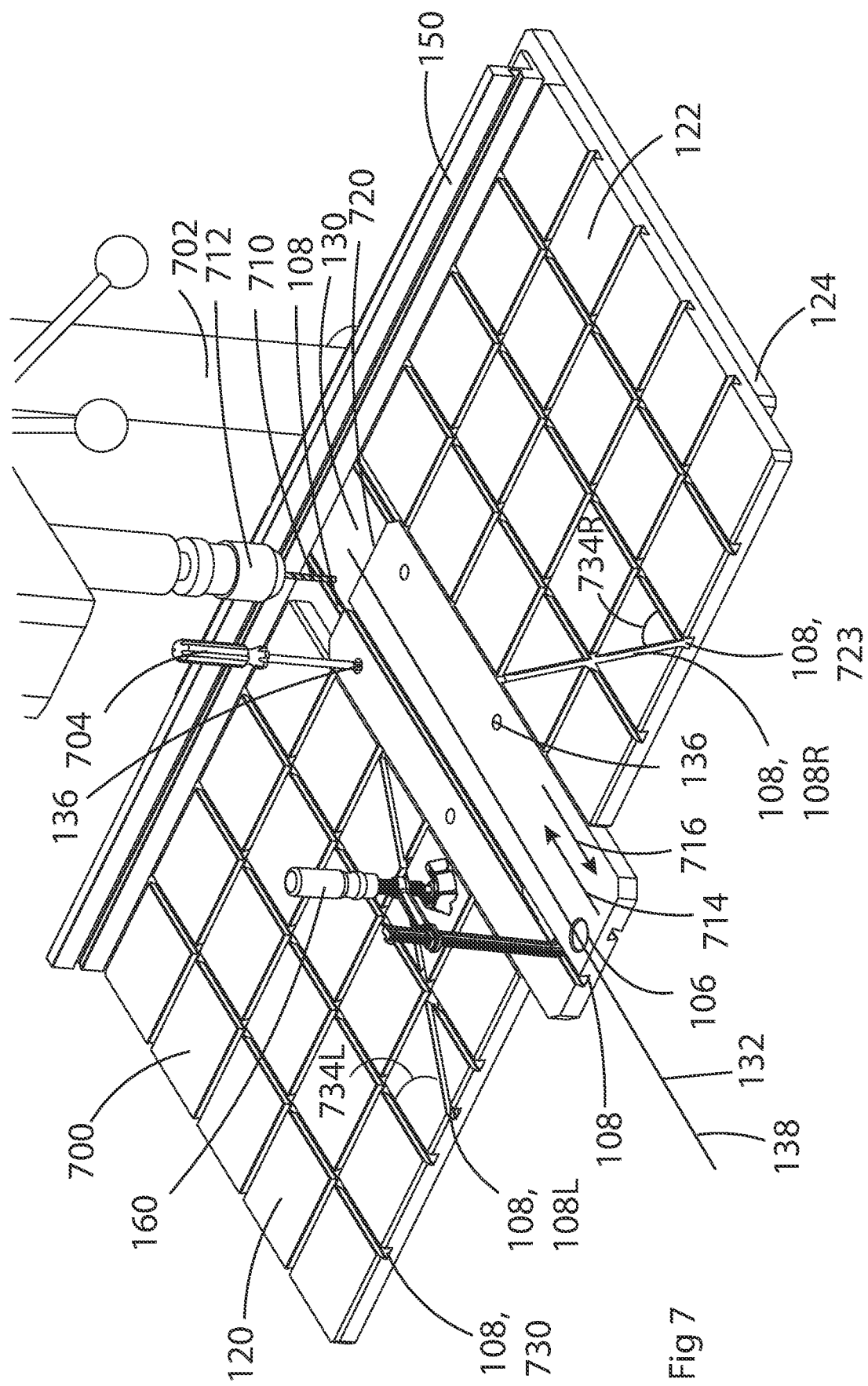
FIG. 7 shows an alternate example embodiment of the worktable installed on a drill press.

FIG. 7 shows an alternate example embodiment of the worktable 700 installed on a drill press 702. A tool 704 is shown tightening the Matchfit™ hardware 200 (including a dovetail anchor nut disposed in the dovetail slot 108 in the support base 124) to secure the center slide 106 in the position shown. In this configuration, the worktable 100 can be used to secure workpieces for working by a tool 710 disposed in the chuck 712 of the drill press 702.

During operation, the tool 710 may penetrate the center slide 106 after passing through a workpiece. The center slide 106 thereby provides backing support immediately adjacent the hole that is formed in the workpiece and this backing support minimizes splintering of the workpiece. The center slide 106 can be moved in the forward direction 714, in the rearward direction 716 (under the fence 150), and/or flipped to move a fresh (undrilled) portion of the center slide 106 under the tool 710 to provide backing support for other drilled holes. When the center slide 106 has reached the end of its useful life (as determined by the user), a new center slide 106 can be installed. The offset location of the dovetail slot 108 ensures the dovetail slot 108 remains intact while a remainder of the center slide 106 is drilled during workpiece operations. While the dovetail slot 108 shown in FIG. 7 stops short of an end 720 of the center slide 106, as shown in FIG. 6, the dovetail slot 108 may extend to the end 720.

As noted above, the dovetail grids may include more dovetail slots 108 than the parallel and perpendicular dovetail slots 108 shown in, for example, FIG. 1. In the example embodiment shown in FIG. 7, the left dovetail grid 730 and the right dovetail grid 732 each include a respective dovetail slot 108L, 108R that is disposed at a respective angle 734L, 734R to another of the dovetail slots 108. In the example embodiment shown, angle 734L is thirty (30) degrees and angle 734R is forty-five (45) degrees. However, angles 734L, 734R can be any angle desired. Further, the angles 734L, 734R may be different from each other as shown, or they may be the same as each other. In the example embodiment shown, dovetail slots 108L is directly aligned with the tool 710 such that if extended it would pass directly under the tool 710. In contrast, dovetail slot 108R is not directly aligned with the tool 710. Alternately, both or neither of the dovetail slots 108L, 108 R may be directly aligned with the tool 710

There may be any number of dovetail slots 108L and some or all of these may be oriented at common angle 734L (parallel to each other). Alternately, some or all of the number of dovetail slots 108L may be at unique angles 734L (not parallel to each other). There may also be a combination where some of the number of dovetail slots 108L may be oriented at common angle 734L (parallel to each other) and some of the number of dovetail slots 108L may be at unique angles 734L (not parallel to each other). Some, all, or none of the number of dovetail slots 108L may be directly aligned with the tool 710. The same applies to the right dovetail slots 108R.

Figure 8:
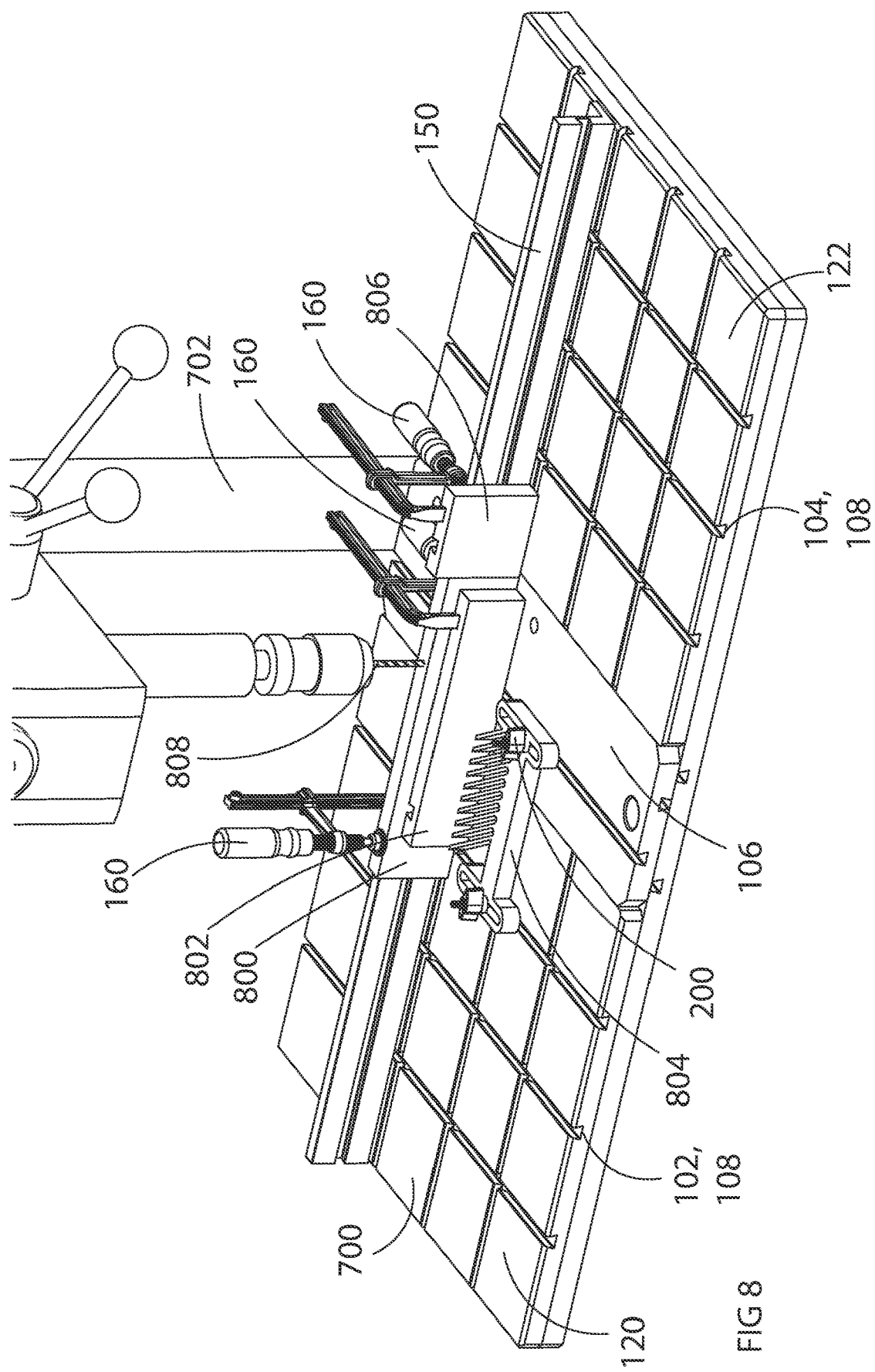
FIG. 8 shows the worktable of FIG. 7 configured for a first drilling operation.

FIG. 8 shows the worktable 700 of FIG. 7 configured for a first drilling operation. A workpiece 800 is clamped between the fence 150 and a support piece 802 using a first Matchfit™ F-type clamp 160. A featherboard 804 is clamped to the worktable 100 via Matchfit™ hardware 200 to press the support piece 802 against the workpiece 800. The workpiece 800 is also clamped downward onto the worktable 100 by a second Matchfit™ F-type clamp 160 on a left end of the workpiece 800. A right end of the workpiece 800 is held in place by a stop 806 that is secured to the fence 150 by a third Matchfit™ F-type clamp 160. This arrangement holds the workpiece 800 secure so a drill bit 808 can be lowered into the workpiece 800. The center slide 106 will provide a back support if the hole being drilled is to fully penetrate the workpiece 800, thereby minimizing splintering of the workpiece 800.

Figure 9:
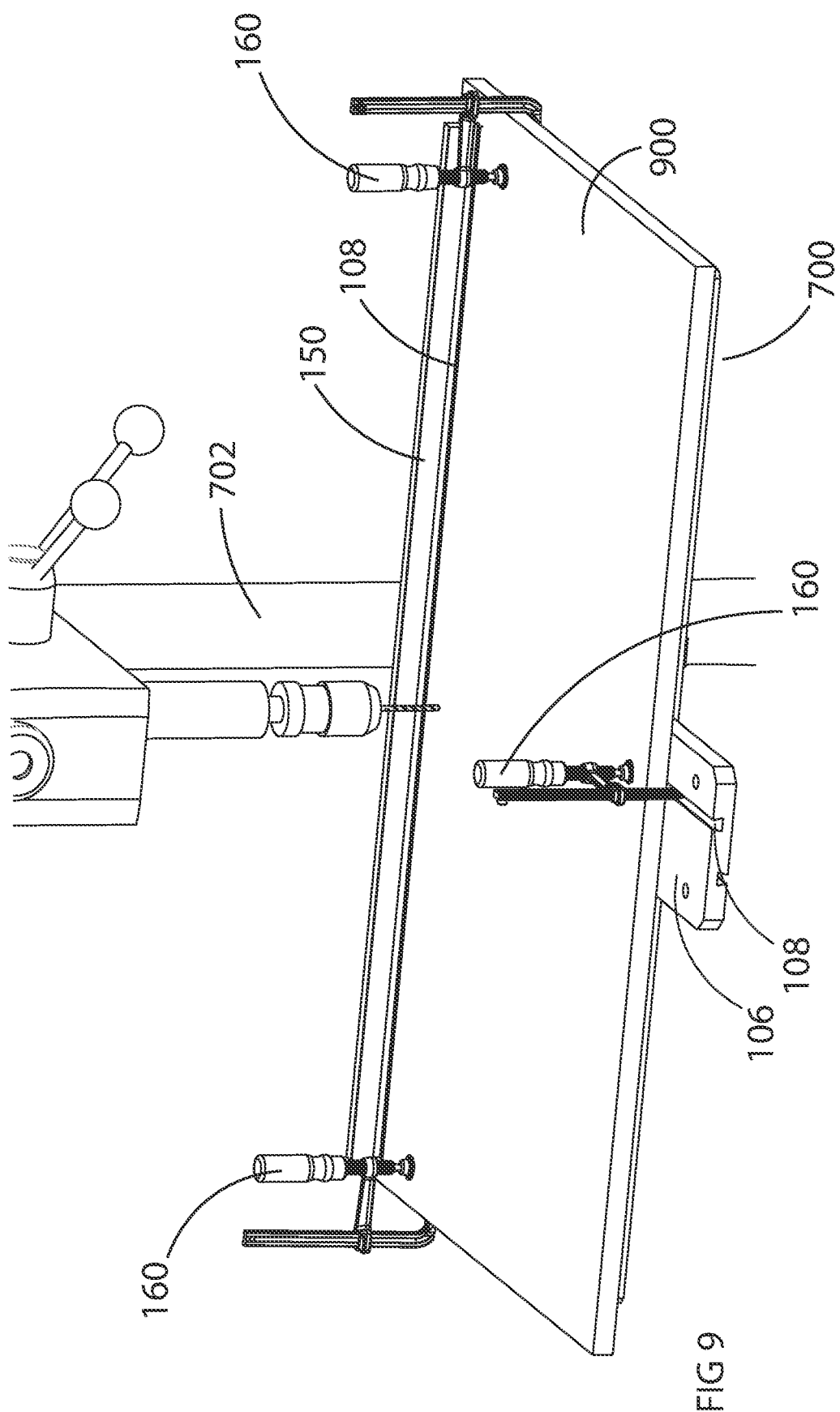
FIG. 9 shows the worktable of FIG. 7 configured to support a large workpiece.

FIG. 9 shows the worktable of FIG. 7 configured to support a large workpiece 900. In this configuration, the center slide 106 is extended in the forward direction (out of the page in FIG. 9) to provide extra support for the large workpiece 900. The dovetail slot 108 in the center slide 106 permits clamping a front edge of the large workpiece 900 using a Matchfit™ F-type clamp 160. Side edges of the large workpiece 900 are likewise supported by additional using Matchfit™ F-type clamps 160. This is made possible because the dovetail slots 108 open up to the edge of the worktable 700, allowing for insertion of the base of the Matchfit™ F-type clamps 160 from the edge of the worktable 700.

Figure 10:
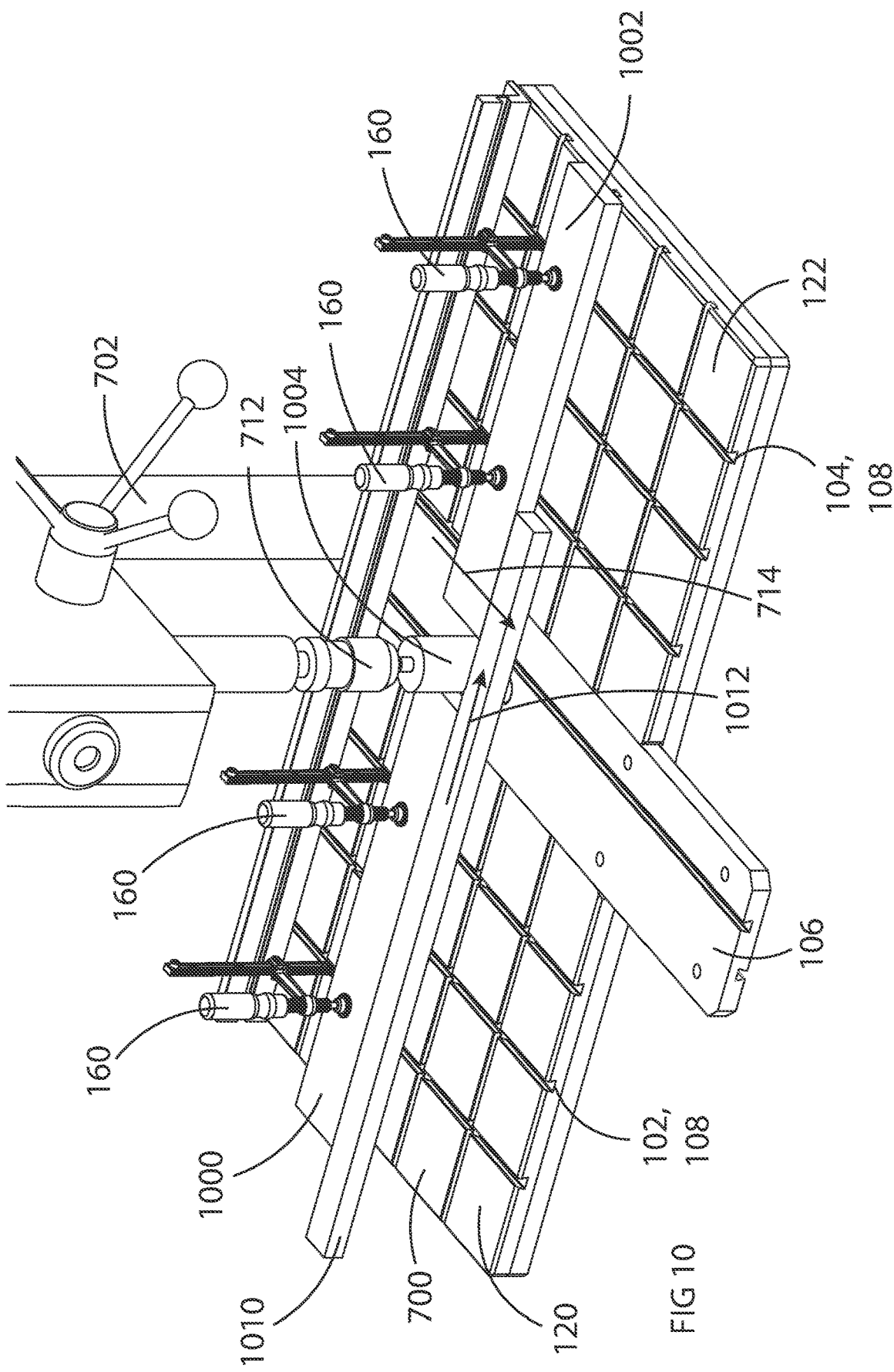
FIG. 10 shows the worktable of FIG. 7 configured for a sanding operation.

FIG. 10 shows the worktable 700 of FIG. 7 configured for a sanding operation. An unsanded side support 1000 is secured to the left side of the worktable 700 via two Matchfit™ F-type clamps 160. A sanded side support 1002 is secured to the right side of the worktable 700 via two Matchfit™ F-type clamps 160. The sanded side support 1002 is positioned slightly forward (along direction 714) of the sanded side support 1002. A sanding drum 1004 is installed in the chuck 712. A workpiece 1010 is moved to the right along direction 1012. The sanding drum 1004 sands the side of the workpiece 1010 as the workpiece 1010 is moved to the right, thereby removing material from the side. The amount of distance the sanded side support 1002 is positioned forward of the unsanded side support 1000 corresponds to an amount of material being removed from the workpiece 1010 so that the workpiece 1010 is properly supported on both sides of the sanding drum 1004, similar to how a jointer is configured. The known prior art only provides a single track on the left side and a single track on the right side. Each of these tracks extends from the front of the worktable to the back. This would only permit one clamp for the unsanded side support 1000 and one clamp for the sanded side support 1002. A side support that is supported by only one clamp would not be able to maintain its orientation but would instead pivot. Consequently, the known prior art would not be able to properly support the operation shown in FIG. 10.

In addition, the center slide 106 can be moved forward and out of the way of the sanding drum 1004, or shortened to make room for the sanding drum 1004. Alternately, a recess can be formed in the center slide 106 that is capable of receiving a bottom end of the sanding drum 1004. In such a recessed configuration the sanding surface of the sanding drum 1004 can extend downward past the bottom edge of the workpiece 1010, thereby ensuring the entire side of the workpiece 1010 contacts and is sanded by the sanding drum 1004. Any such recess can also extend laterally sideways away from the workpiece 1010 and under a vacuum fixture so sawdust can be drawn laterally away from the workpiece 1010 and into the vacuum system.

Figure 11:
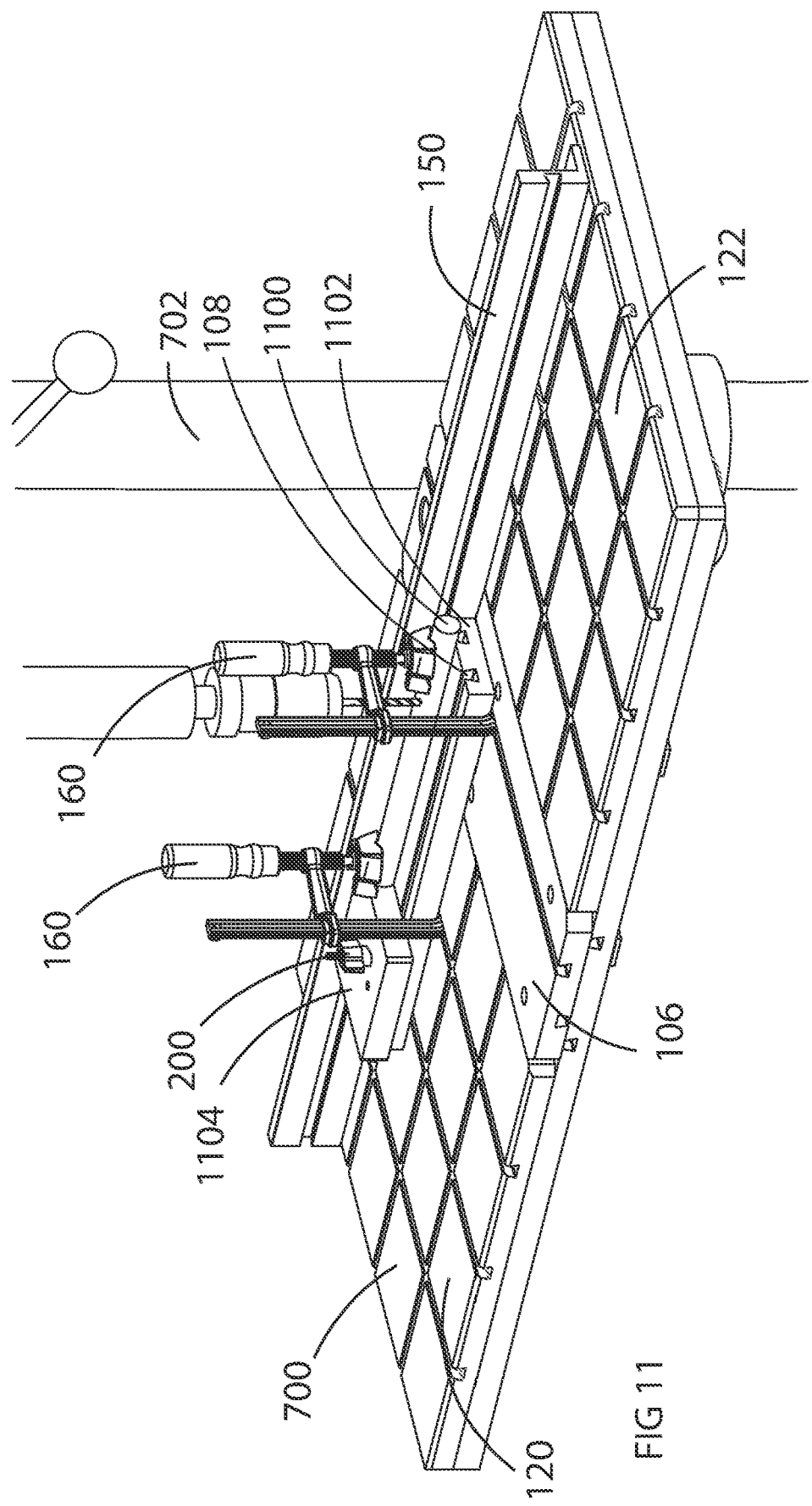
FIG. 11 shows the worktable of FIG. 7 configured for a second drilling operation.

FIG. 11 shows the worktable 700 of FIG. 7 configured for a second drilling operation. Round stock 1100 is disposed atop a support 1102 and both are clamped to the worktable 700 via two Matchfit™ F-type clamps 160. The support 1102 has two dovetail slots 108. The round stock 1100 rests in one of the dovetail slots 108. An end stop 1104 is secured to the second dovetail slot 108 via Matchfit™ hardware 200. A Matchfit™ X-Pad is installed on the two Matchfit™ F-type clamps 160 to further stabilize the position of the round stock 1100 relative to the Matchfit™ F-type clamps 160. This arrangement provides lateral (anti-rolling) stability at the top of the round stock 1100 and also at the bottom of the round stock 1100. Drilling holes in round stock 1100 is therefore greatly simplified. In addition, once centered by the dovetail slot 108 in the support 1102, the round stock 1100 can be moved longitudinally so that many holes can be drilled, and all will be centered in the round stock 1100 with minimal additional positioning effort.

Figure 12:
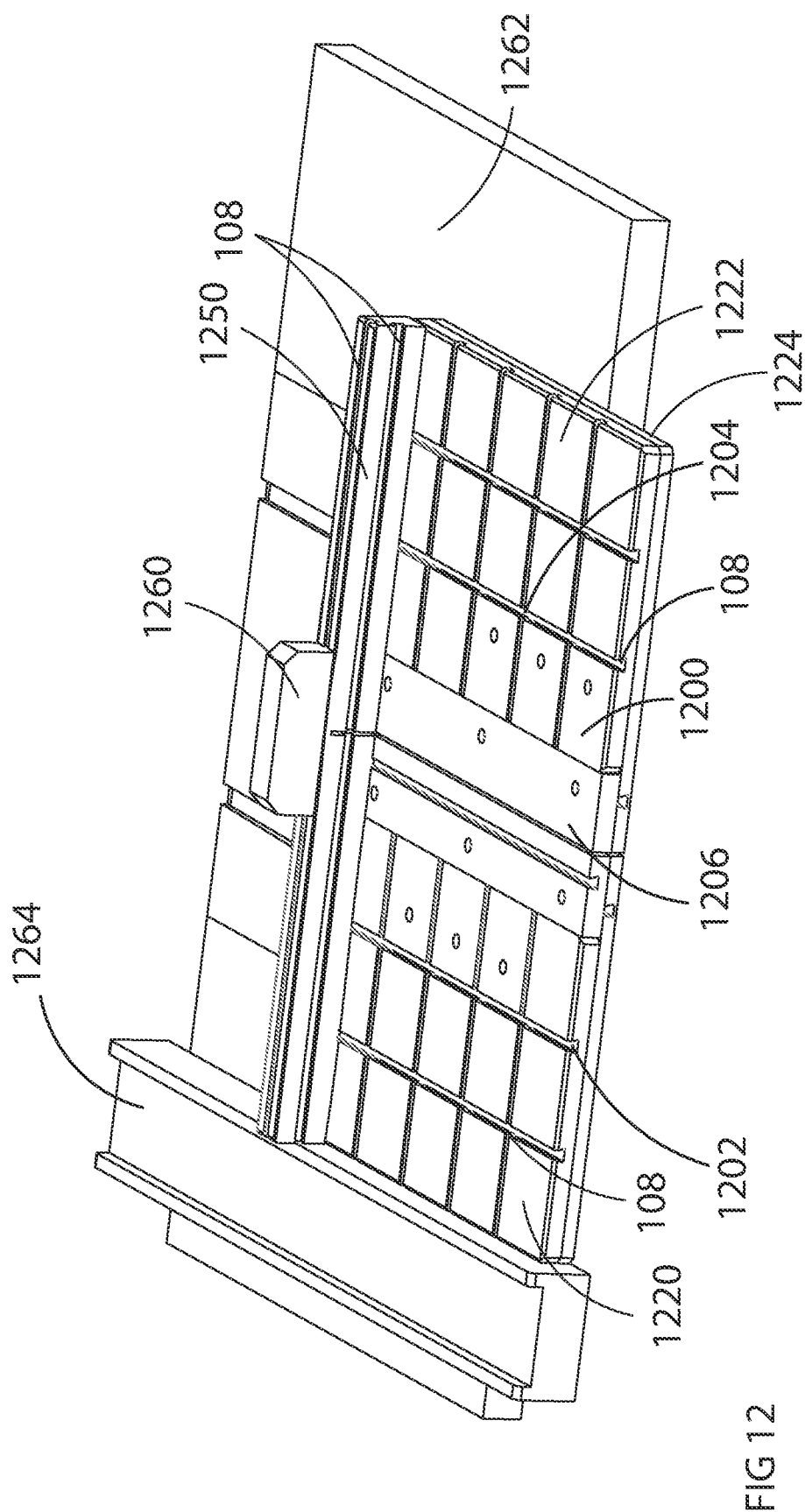
FIG. 12 shows an alternate example embodiment of the worktable installed on a table saw.

FIG. 12 shows an alternate example embodiment of the worktable 1200 installed on a table saw. The worktable 1200 includes the left dovetail slot grid 1202 of dovetail slots 108, a right dovetail slot grid 1204 of dovetail slots 108 and secured to the left dovetail slot grid 1202, a center slide 1206 configured to be adjustably positionable between the left dovetail slot grid 1202 and the right dovetail slot grid 1204, a left wing 1220, a right wing 1222, and a base 1224 similar to that described above. In this embodiment, the base 1224 extends a full width of the worktable 1200. The worktable 1200 includes a fence 1250 with dovetail slots 108, and a bridging feature 1260. The worktable 1200 is configured to place the center slide 1206 over a saw blade (not visible) of the table saw 1262 and to travel parallel to a plane of the saw blade. In this example embodiment, a left side of the worktable 1200 rests against and is guided in its motion by a saw table fence 1264.

Figure 13:
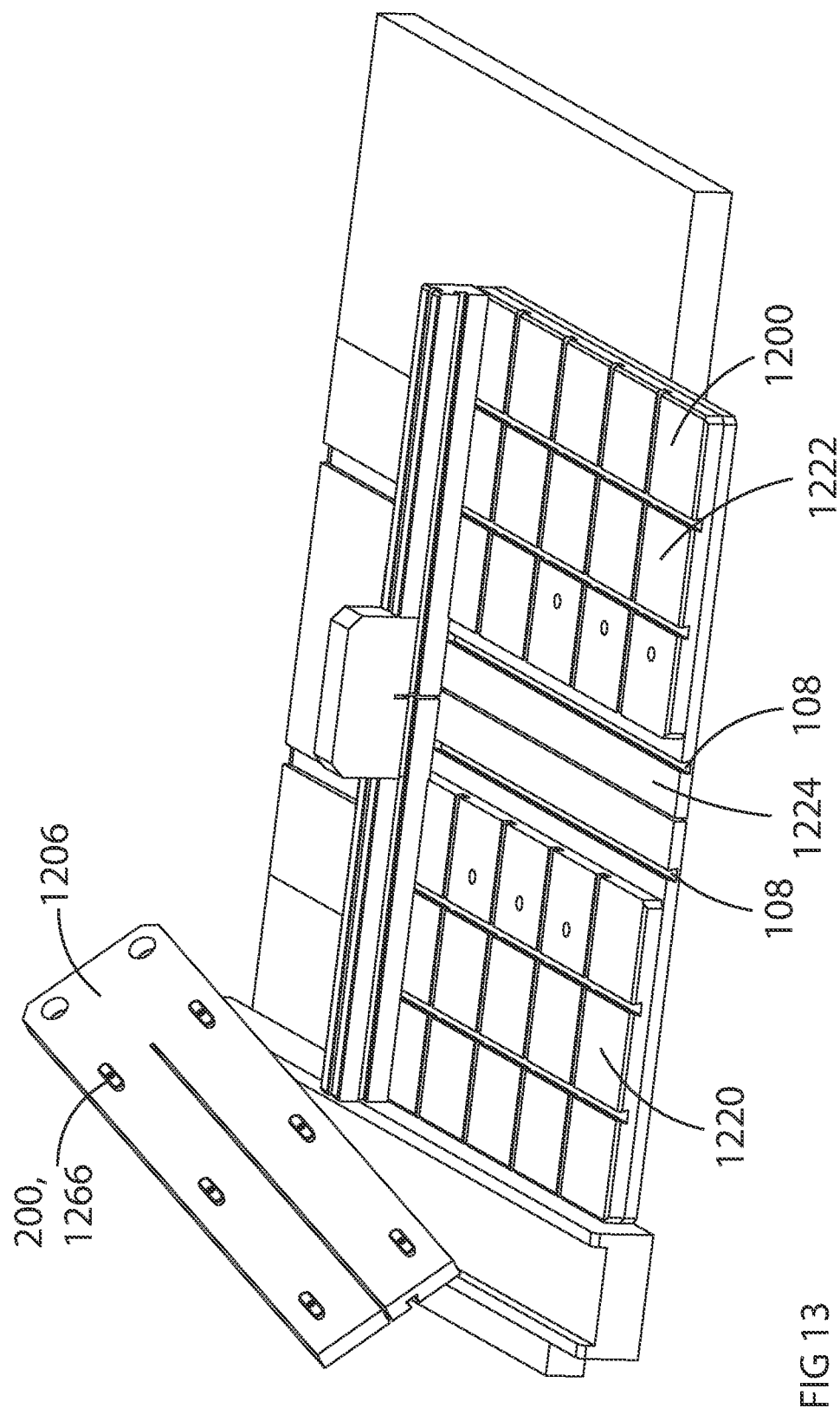
FIG. 13 shows the worktable of FIG. 12 with the center slide displaced.

FIG. 13 shows the worktable 1200 of FIG. 12 with the center slide 1206 displaced. Dovetail slots 108 can be seen in the base 1224. Dovetail anchor nuts 1266 of the Matchfit™ hardware 200 are secured to the center slide 1206 and are positioned in the dovetail slots 108 in the base 1224 to adjustably secure the center slide 1206 to the base 1224.

Figure 14:
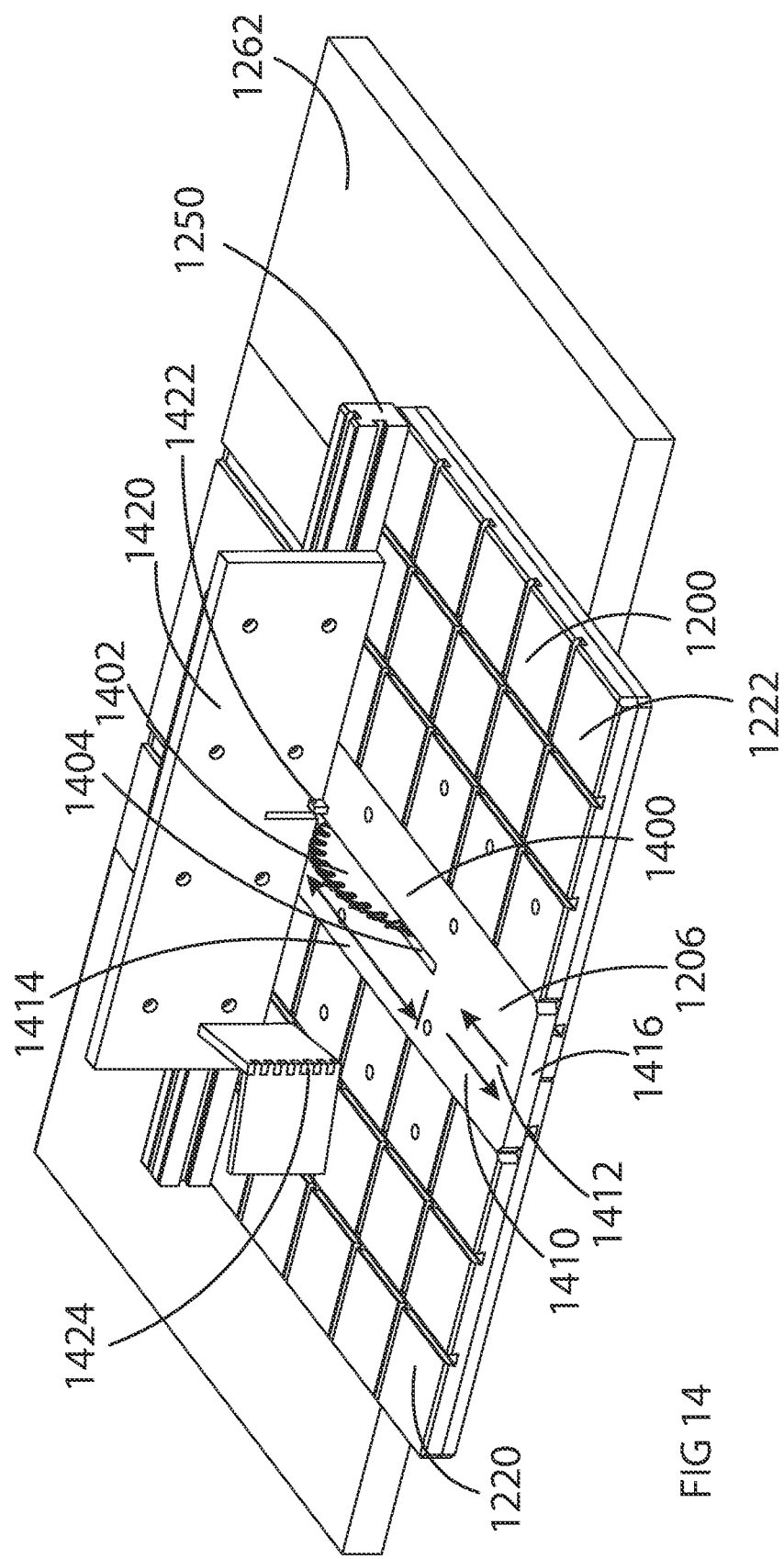
FIG. 14 is a front view of the worktable of FIG. 12 with the center slide acting as a partial length zero clearance insert for a dado blade.

FIG. 14 is a front view of the worktable 1200 of FIG. 12 with the center slide 1206 acting as a partial length zero clearance insert 1400 for a dado blade 1402. To create the partial length zero clearance insert 1400, the center slide 1206 was positioned over a fully retracted dado blade 1402, the table saw 1262 was turned on and the dado blade 1402 was raised into the center slide 1206. This creates a slot 1404 in the partial length zero clearance insert 1400 that matches a width of the dado blade 1402. An amount of movement of the worktable 1200 in the forward direction 1410 and the rearward direction 1412 determines a length 1414 of the slot 1404. In this example embodiment, because it is a partial length zero clearance insert 1400, a structural integrity of a forward end 1416 of the center slide 1206 is maintained. An additional guide 1420 with a stop 1422 may be installed against the fence 1250 to aid in performing such operations as forming a box joint 1424.

Figure 15:
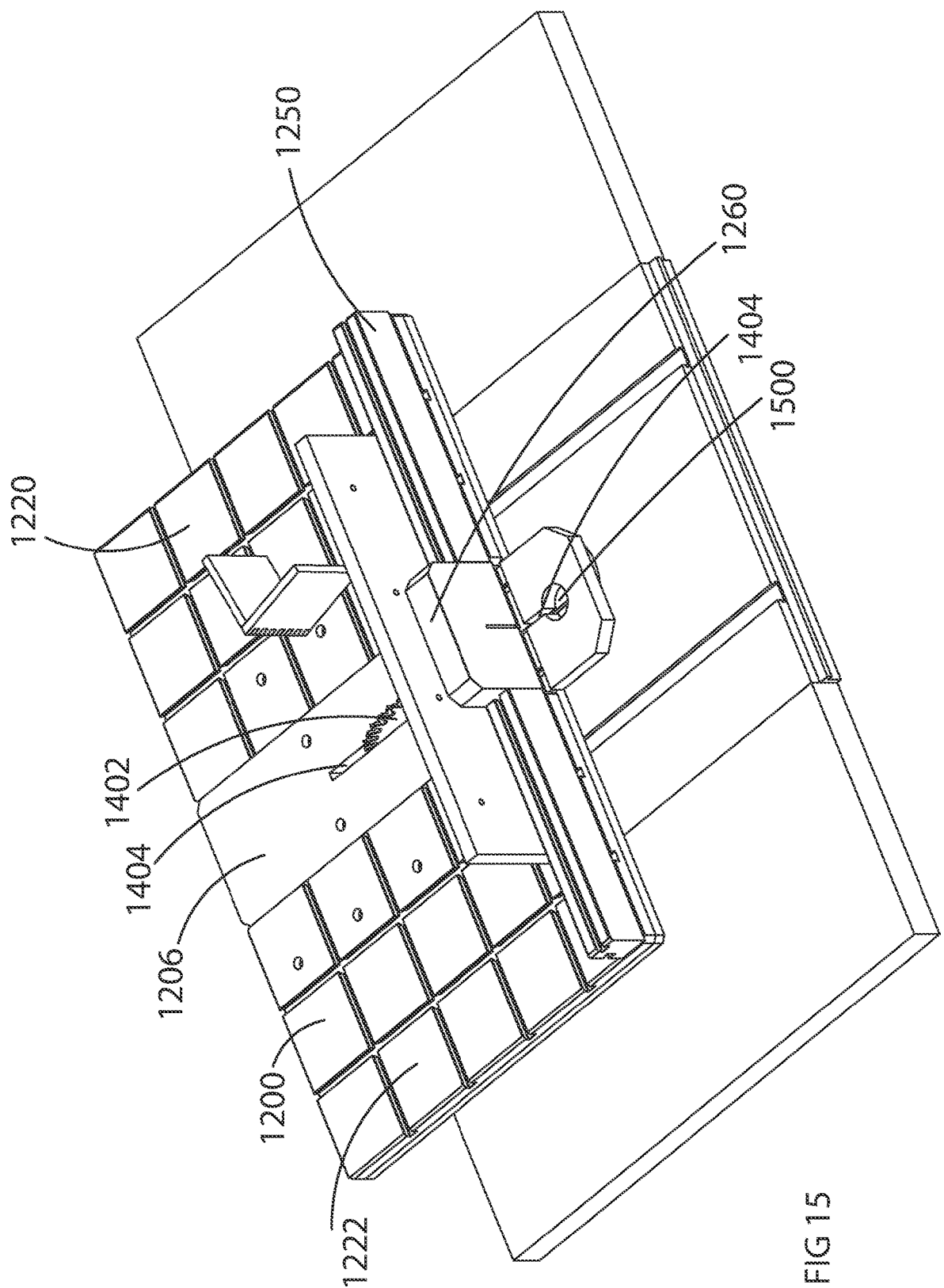
FIG. 15. is rear view of the worktable of FIG. 14.

FIG. 15. is rear view of the worktable 1200 of FIG. 14. In this example embodiment, the slot 1404 extends to, but not past, a finger hole 1500. Hence, the structural integrity of both ends of the center slide 1206 is maintained. This may aid in holding the right and left halves of the worktable 1200 together after the slot 1404 has been cut.

Figure 16:
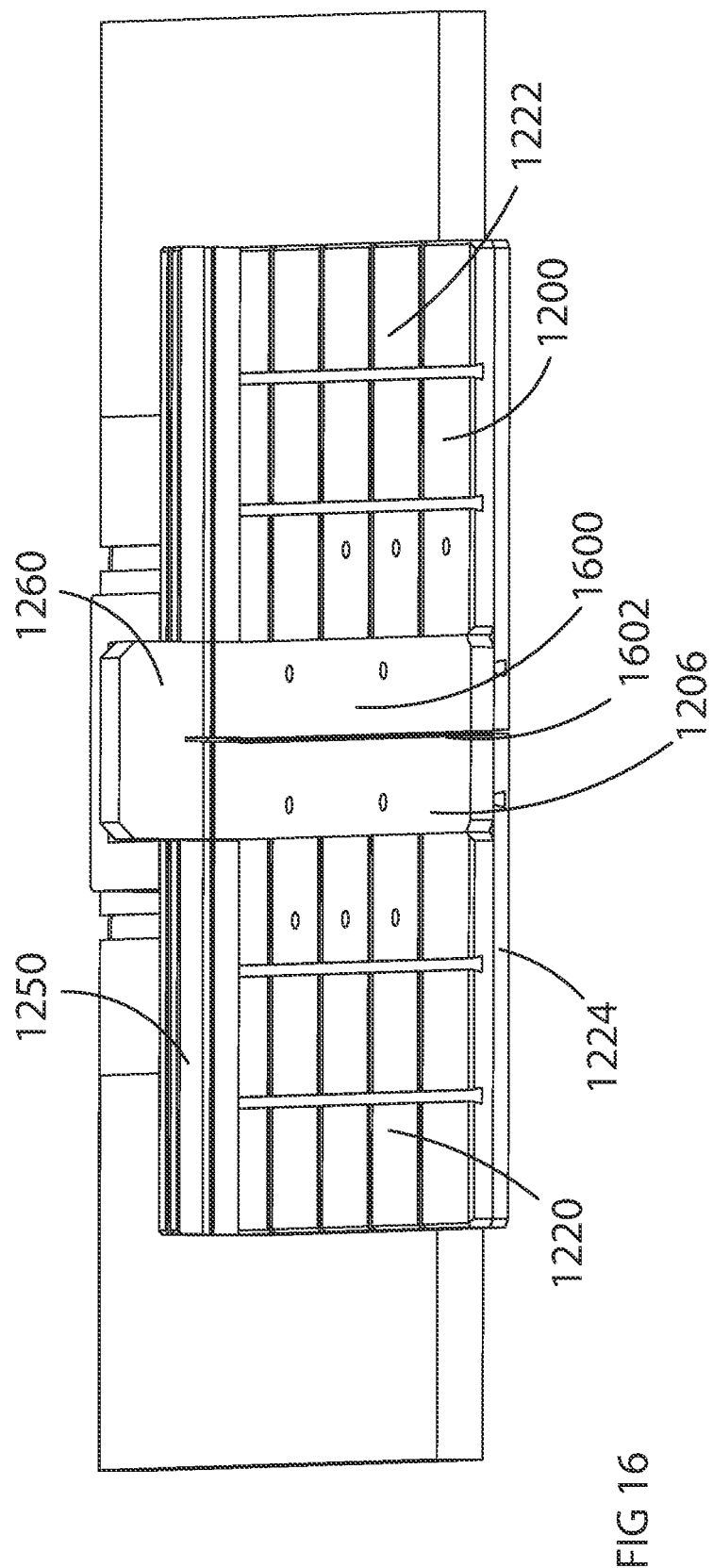
FIG. 16 is a front view of the worktable of FIG. 12 with the center slide 1206 acting as a full-length zero clearance insert for a saw blade.

FIG. 16 is a front view of the worktable 1200 of FIG. 12 with the center slide 1206 acting as a full-length zero clearance insert 1600 for a saw blade. In this example embodiment, a conventional saw blade (not visible) is used to cut a full length zero clearance slot 1602 in the center slide 1206. Since a conventional saw blade is narrower than a dado blade, the full length zero clearance slot 1602 of FIG. 16 will likewise be narrower than the partial length zero clearance slot 1404 of FIG. 14. There are a variety of saw blade widths available. Since the center slide 1206 can so readily be removed, and since the center slide 1206 can be made from relatively inexpensive materials, there can be a center slide 1206 and correspondingly sized slot for each saw blade at minimal cost and minimal effort to install and/or swap. Similarly, a center slide 1206 can be made for each different angle at which a given saw blade is to be used.

In this example embodiment, the full length zero clearance slot 1602 cuts the center slide 1206 completely in half. This may also cut the base 1224 completely in half as well as part of the fence 1250. To help hold the halves of the worktable 1200 together, the bridging feature 1260 remains uncut. This is possible because the bridging feature overlies the remainder of the worktable 1200 and is thereby positioned above the sweep of the saw blade. Hence, the bridging feature 1260 bridges the full length zero clearance slot 1602 and holds the halves of the worktable 1200 together.

Figure 17:
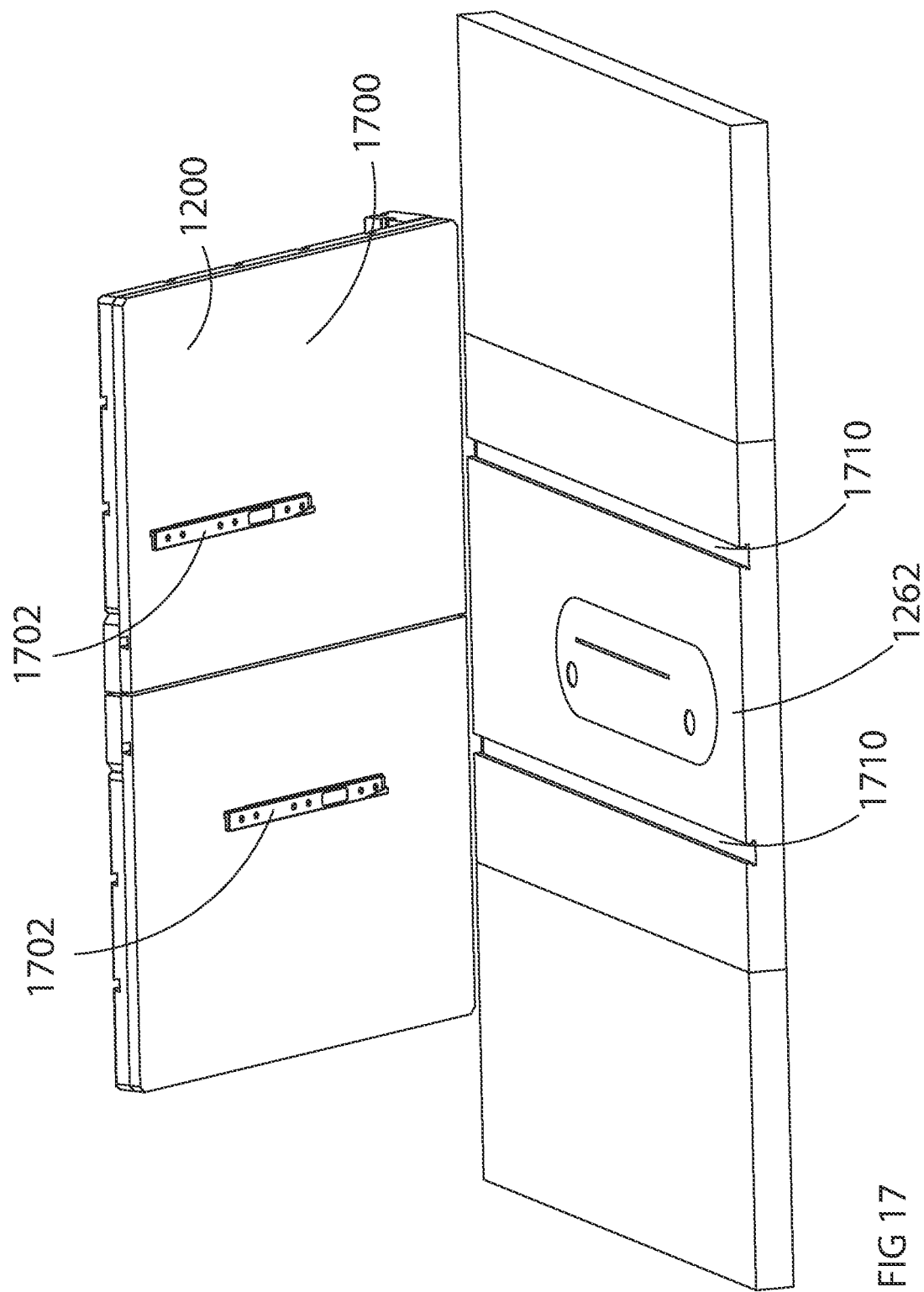
FIG. 17 shows a bottom of the worktable of FIG. 12.

FIG. 17 shows a bottom 1700 of the worktable 1200 of FIG. 12. Guides 1702 are disposed on the bottom 1700 of the worktable 1200. The guides 1702 cooperate with grooves 1710 in the table saw 1262 to guide the movement of the worktable 1200. In an example embodiment, the guides may be Zeroplay™ Miter Bars manufactured by Micro Jig of Winter Park, Fla.

Figure 18:
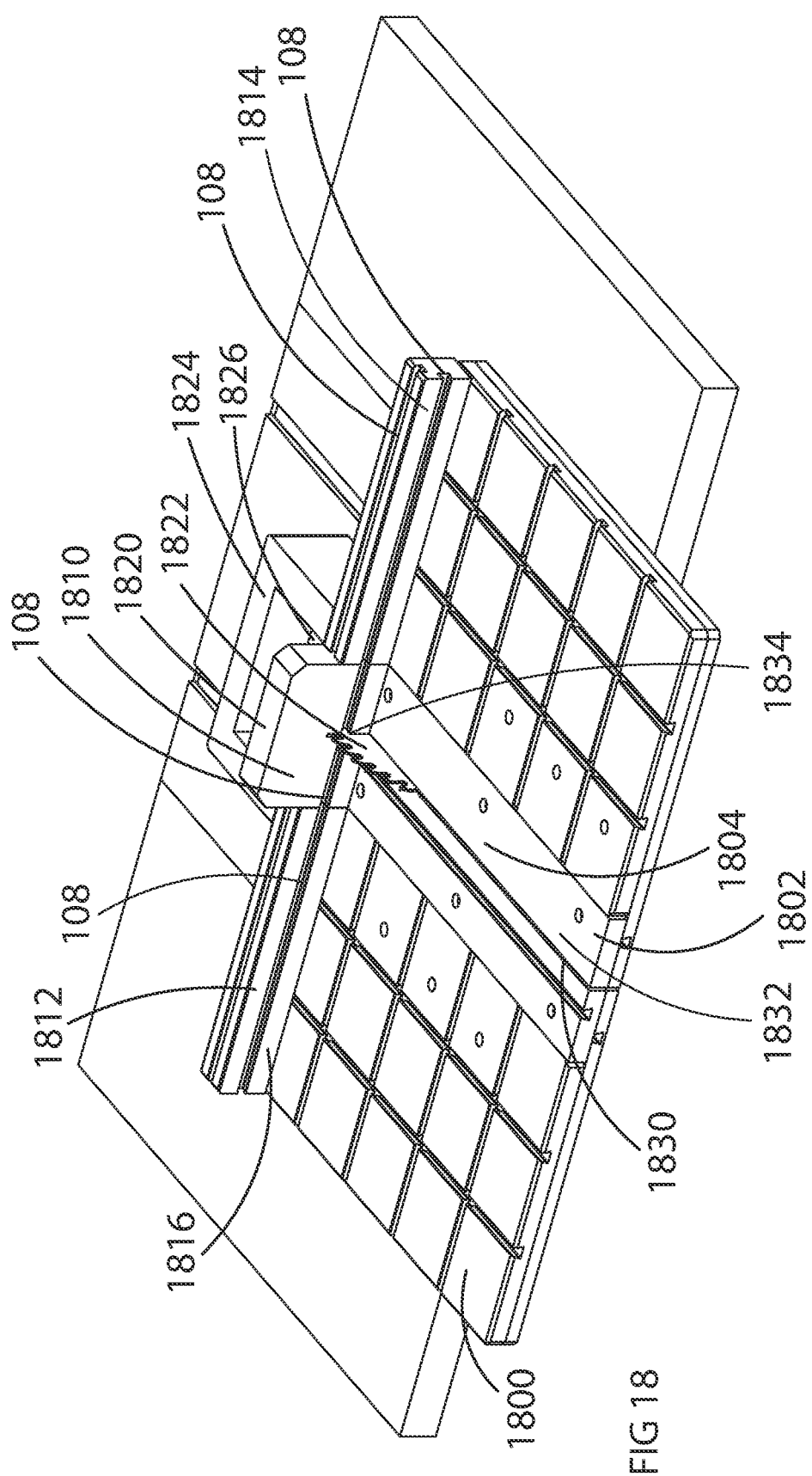
FIG. 18 is a front perspective view of another example embodiment of the worktable installed on a table saw.
Figure 19:
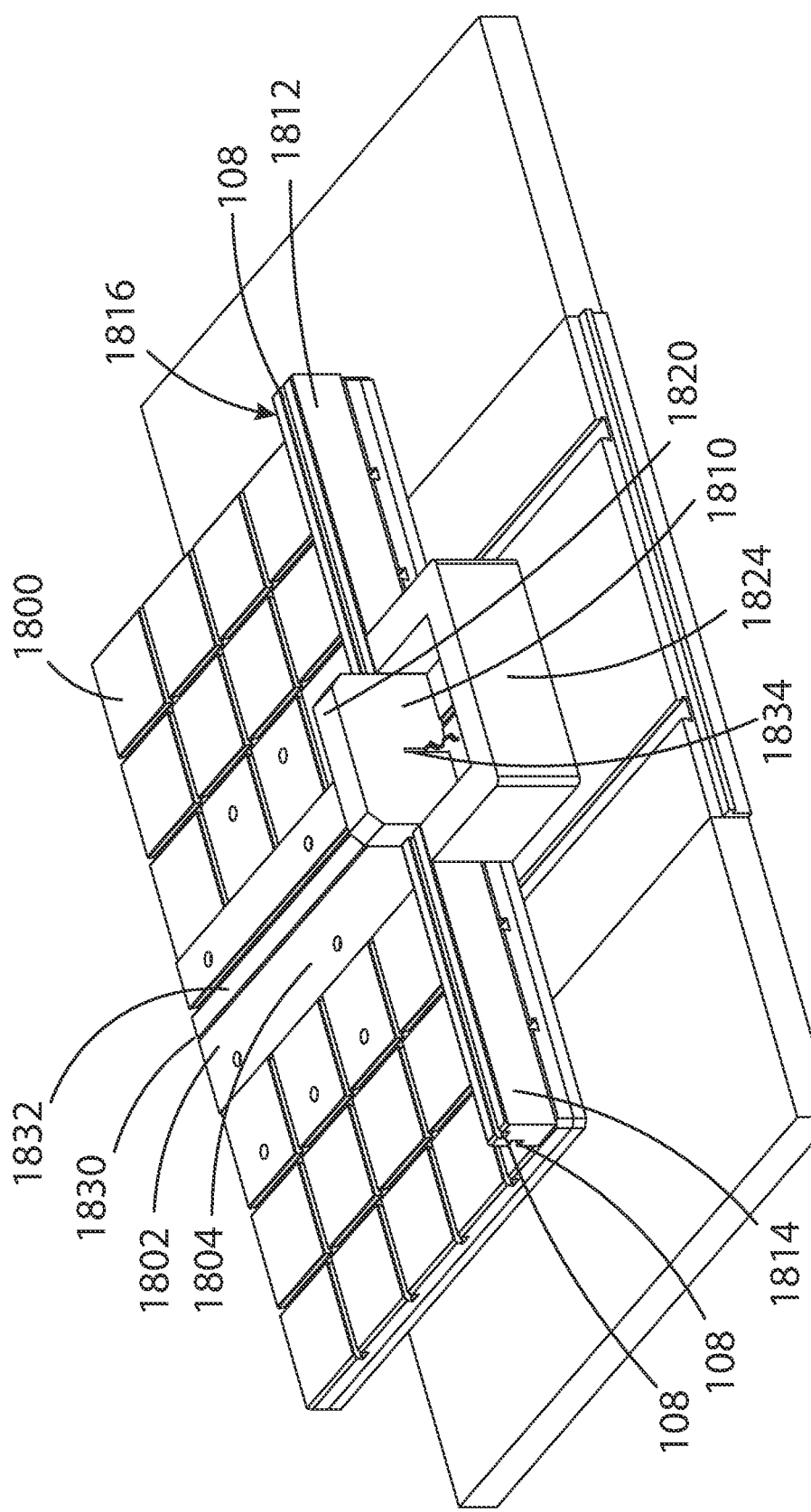
FIG. 19 is a rear perspective view of the worktable of FIG. 18.

FIGS. 18 and 19 show another example embodiment of the worktable 1800 with the center slide 1802 acting as a zero clearance insert 1804. In this example embodiment, the center slide 1802 includes a center fence portion 1810 that sits flush with a left fence portion 1812 and with a right fence portion 1814. The left fence portion 1812, the center fence portion 1810, and the right fence portion 1814 together form the fence 1816. The center fence portion 1810 may be secured to the center slide 1802 via fasteners or adhesive and optionally includes a dovetail slot 108 that aligns with the dovetail slot 108 on the left fence portion 1812 and on the right fence portion 1814. The center fence portion 1810 optionally includes a raised portion 1820 that sits above a sweep of the saw blade 1822 and hence functions like a bridging feature 1260 shown in FIG. 12.

The worktable 1800 optionally includes a second bridging feature 1824 that may follow (or stay outside of) a perimeter 1826 of a rear end the center slide 1802. Following the perimeter 1826 enables the second bridging feature 1824 to remain uncut, or at least not fully cut by the saw blade 1822 when the highest point of the sweep of the saw blade 1822 reaches the center fence portion 1810, at which point the workpiece would be fully cut. The second bridging feature 1824 thereby acts as additional and/or alternative structure that holds the worktable 1800 together even when the center slide 1802 is cut by the saw blade 1822. The second bridging feature 1824 may additionally or alternately rise fully or partly over the sweep of the saw blade 1822.

By associating the center fence portion 1810 with the center slide 1802, the center fence portion 1820 will act as a dedicated, zero clearance fence portion for the saw blade 1822. For example, if the center slide 1802 is used as a zero clearance insert for a dado blade, the dado blade will cut a slot 1830 in a flat portion 1832 of the center slide 1802 that matches a width of the dado blade. The dado blade will also cut a slot 1834 in the center fence portion 1810 that matches a width of the dado blade. If the dado blade is replaced with a blade of a different diameter, or if the dado blade is moved to a different angle, a fresh center slide 1802 can be installed and a fresh slot 1830 will be cut in the flat portion 1832 and a fresh slot 1834 will be cut in the center fence portion 1810. If the center fence portion 1810 were not part of the center slide 1802, then the same fence would be cut once for the first dado blade and again for the blade with the different diameter or different angle. This process would quickly remove most of the fence in a region around the blade, rendering the fence unsuitable as a support in that region. Having the center fence portion 1810 be part of the replaceable center slide 1802 provides for improved zero clearance function while also extending the life of the fence.

As disclosed above, the worktable disclosed herein provides improved support and clamping compared to the prior art. In addition, the center slide can be readily and inexpensively manufactured by a user. This makes it much more affordable to replace a worn center slide and/or create an inventory of, for example, various zero clearance saw blade inserts compared to the prior art. Hence, the worktable provides improved functionality and a reduced cost, and thereby represents an improvement in the art.

While various embodiments of the present invention have been shown and described herein, it will be obvious that such embodiments are provided by way of example only. Numerous variations, swapping of features among embodiments, changes, and substitutions may be made without departing from the invention herein. Accordingly, it is intended that the invention be limited only by the spirit and scope of the appended claims.

The invention claimed is:

1. An apparatus, comprising:
a worktable, comprising:
a left wing into which is recessed a left slot grid;
a right wing into which is recessed a right slot grid, which is discrete from the left wing, and which is secured to the left wing;
a slot disposed between the left wing and the right wing, that extends from a front of the worktable to a back of the worktable, and that opens through a front edge and a back edge of the worktable;
a support base under the left wing and the right wing which secures the left wing and the right wing in fixed positions relative to each other and to the support base;
a fence; and
a center panel configured to fit into the slot, to rest on the support base, and to be selectively moved relative to the support base and to the fence;
wherein an upper surface of the left wing, an upper surface of the right wing, and an upper surface of the center panel collectively form at least part of a flat worksurface of the worktable.

2. The apparatus of claim 1, wherein the left slot grid comprises a grid of dovetail slots, and wherein the right slot grid comprises a grid of dovetail slots.

3. The apparatus of claim 1, wherein the support base comprises a support base dovetail slot under the center panel, and wherein the apparatus further comprises a fastener that is configured to move in the support base dovetail slot as the center panel moves along the slot and also to secure the center panel in a fixed position relative to the support base upon reaching a selected position.

4. The apparatus of claim 1, wherein the support base is discrete from the left wing and the right wing.

5. The apparatus of claim 1, wherein the center panel comprises an upper surface dovetail slot on the upper surface of the center panel.

6. The apparatus of claim 5, wherein the upper surface dovetail slot is off center relative to a longitudinal axis of the center panel.

7. The apparatus of claim 5, wherein the center panel comprises a lower surface dovetail slot on a lower surface of the center panel that is opposite the upper surface of the center panel.

8. The apparatus of claim 1, wherein the fence comprises a left fence portion disposed over the left wing, a right fence portion disposed over the right wing, and a center fence portion disposed over the slot and between the left fence portion and the right fence portion,
wherein the center panel is configured to move in the slot under the fence while the fence remains in a fixed position relative to the left wing and the right wing.

9. The apparatus of claim 1, wherein a front face of the fence comprises a dovetail slot.

10. The apparatus of claim 1, wherein slots of the left slot grid and slots of the right slot grid extend under the fence to a rear edge of the worktable.

11. The apparatus of claim 1, further comprising:
a guide disposed on a bottom of the support base and configured to cooperate with a groove in a table saw to position a saw blade of the table saw under the center panel and between the left slot grid and the right slot grid.

12. The apparatus of claim 11, wherein the fence comprises a left fence portion disposed over the left wing and a right fence portion disposed over the right wing; and a bridging connector at least one of 1) directly connected to the left fence portion and to the right fence portion, and 2) is disposed between the left fence portion and the right fence portion, wherein the bridging connector is configured to secure the left wing to the right wing whether or not the support base is cut in two by the saw blade.

13. An apparatus, comprising: a worktable, comprising:
a left wing comprising a left wing upper surface into which is recessed a left dovetail slot grid;
a right wing comprising a right wing upper surface into which is recessed a right dovetail slot grid secured to the left dovetail slot grid;
a slot between the left wing and the right wing that extends from a front of the worktable to a back of the worktable, that opens through a front end and a back edge of the worktable, and which defines a slot longitudinal axis;
a support base under the left wing and under the right wing that defines a bottom of the slot, wherein the left wing, the right wing, and the support base are configured to be held in fixed positions relative to each other and thereby form a unit;
a fence; and
a center panel configured to fit in the slot, to rest on the support base, and to be selectively moved relative to the unit and to the fence;
wherein an upper surface of the left wing, an upper surface of the right wing, and an upper surface of the center panel collectively form at least part of a flat worksurface of the worktable.

14. The apparatus of claim 13, wherein the center panel is configured to extend from the slot in a direction forward of the worktable.

15. The apparatus of claim 13, wherein the support base comprises a support base dovetail slot under the center panel.

16. The apparatus of claim 13, wherein the center panel comprises an upper surface dovetail slot on the upper surface of the center panel.

17. The apparatus of claim 13, wherein the fence comprises a left fence portion disposed over the left wing, a right fence portion disposed over the right wing, and a center fence portion disposed over the slot, wherein the center panel is configured to move in the slot under the fence while the fence remains in a fixed position relative to the left wing and the right wing, and
wherein dovetails of the left dovetail slot grid and dovetails of the right dovetail slot grid extend under the fence to a rear edge of the worktable.

18. The apparatus of claim 13, further comprising:
a guide disposed on a bottom of the worktable and configured to cooperate with a groove in a table saw to position a saw blade of the table saw under the center panel over and between the left dovetail slot grid and the right dovetail slot grid; and
a bridging connector configured to secure the left wing to the right wing whether or not the support base is cut in half by the saw blade.

19. The apparatus of claim 13, wherein the left wing, the right wing, and the support base are discrete from each other, and wherein the left wing and the right wing are secured to the support base.

20. The apparatus of claim 13, wherein the left wing, the right wing, and the support base form a monolithic body.

21. The apparatus of claim 13, wherein the support base comprises a support base dovetail slot under the center panel, and wherein the apparatus further comprises:
a nut that is configured to move in the support base dovetail slot as the center panel moves along the slot; and
a threaded fastener secured to the center panel and to the nut;
wherein the nut and the threaded fastener are configured to secure the center panel in a fixed position relative to the support base upon reaching a selected position.

* * * * *